United States Patent [19]
Smith, Jr.

[11] 3,741,233
[45] June 26, 1973

[54] LEAK PREVENTION SYSTEM FOR AN OIL PIPELINE

[75] Inventor: Raymond P. Smith, Jr., Williamsport, Pa.

[73] Assignee: Craftmaster, Inc., Williamsport, Pa.

[22] Filed: Mar. 3, 1972

[21] Appl. No.: 231,480

[52] U.S. Cl.............. 137/117, 137/119, 137/236, 137/568, 417/40
[51] Int. Cl............................................ F04b 49/00
[58] Field of Search.................. 137/119, 120, 121, 137/122, 115, 117, 568, 236, 116; 417/12, 26, 40

[56] References Cited
UNITED STATES PATENTS

| | | | |
|---|---|---|---|
| 1,621,221 | 3/1927 | Pogue | 137/115 |
| 2,773,556 | 12/1956 | Meyers et al. | 137/115 X |
| 2,870,716 | 1/1959 | Meneley | 417/12 |
| 2,940,593 | 6/1960 | Remke et al. | 417/40 X |
| 2,998,016 | 8/1961 | Bottenberg et al. | 137/117 X |
| 3,702,744 | 11/1972 | Brown et al. | 137/115 X |

*Primary Examiner*—William R. Cline
*Attorney*—Richard C. Sughrue, Donald E. Zinn et al.

[57] ABSTRACT

A system for preventing leaks in an oil pipeline indicating the automatic valve which is closed in response to the detection of a leak in the pipeline. An oil sump is connected to the pipeline upstream from the automatic valve. When the automatic valve is closed due to a leak, a check valve is open due to the pressure of the oil in the pipeline and the oil flows into the sump. When the sump becomes filled, the pumping station stops pumping oil and the oil remains in the sump until the pipeline is repaired. After the line has been repaired, the automatic valve and check valve are opened and oil flows from the sump to a receiving station downstream.

14 Claims, 1 Drawing Figure

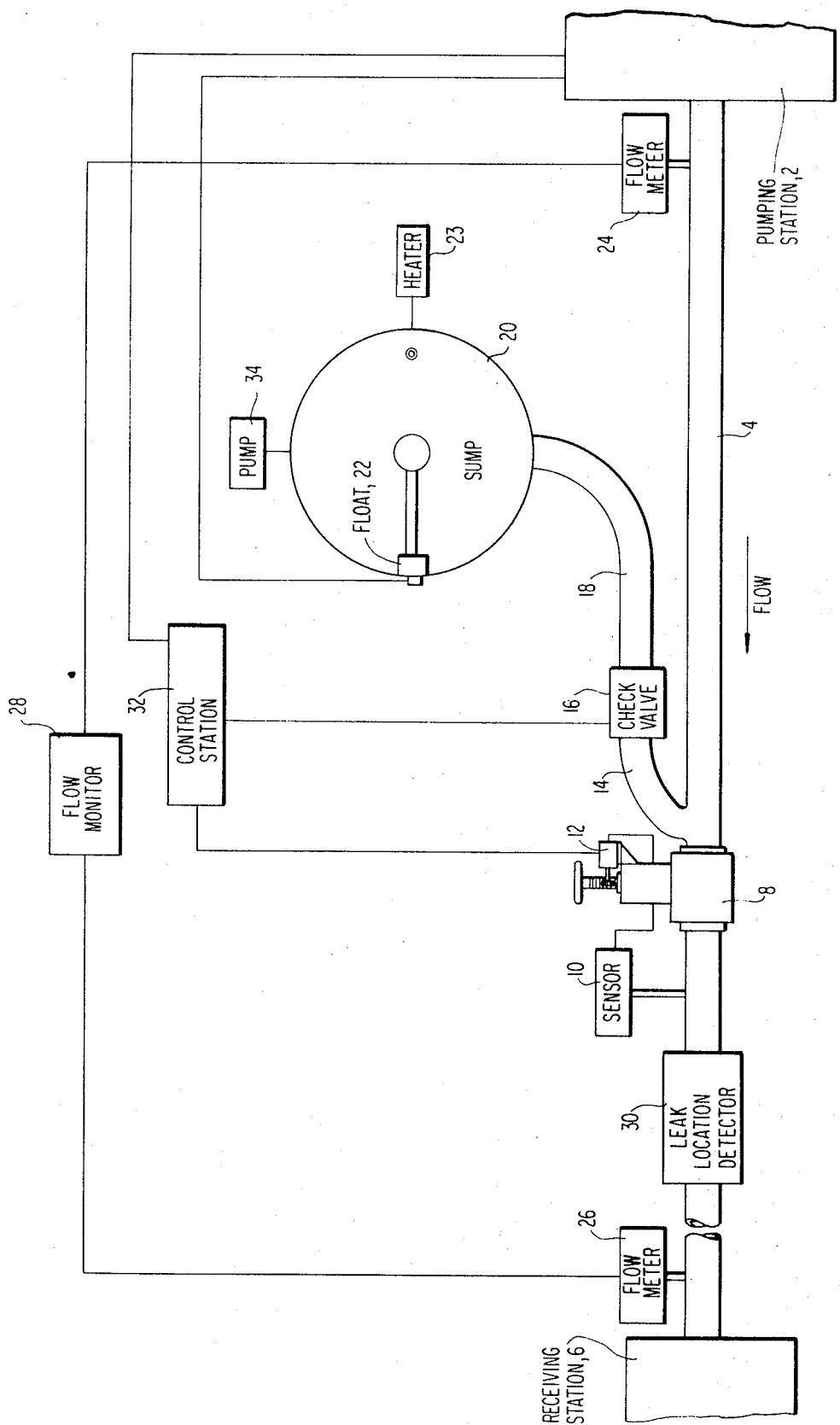

LEAK PREVENTION SYSTEM FOR AN OIL PIPELINE

BACKGROUND OF THE INVENTION

1. Field of the Invention

This invention pertains to a system for preventing oil leaks in an oil pipeline and more particularly to a system including an automatic valve which upon occurrence of a leak in an oil line diverts the flow of oil from the pipeline to an oil sump.

2. Description of the Prior Art

Whenever oil flows through an oil pipeline, the hazards of a leak in the pipeline always exist. Oil leaking from a pipeline has been known to cause environmental disasters as well as the loss of great sums of money due to the loss of the oil and the cost of cleaning up the leaked oil. Although systems exist for detecting the leakage of oil from a pipeline, none of these systems provide for the actuation of an automatic valve in response to the leak wherein the actuation of the valve causes the diversion of the oil from the pipeline to a sump where it may be stored until the leak in the pipeline has been repaired.

SUMMARY OF THE INVENTION

It is, therefore, the primary object of this invention to provide a system for preventing the leakage of oil from an oil pipeline.

It is another object of this invention to provide an oil sump which receives oil from a pumping station when the oil pipeline has been closed due to a leak.

It is a futher object of this invention to provide means for stopping the operation of the pumping station when the level of the oil in the sump reaches a predetermined value.

It is still a further object of this invention to monitor the oil in the pipeline with sensors which can determine the occurrence of a leak and in response thereto actuate an automatic valve for stopping the flow of oil through the pipeline.

This invention is a system for preventing leaks in an oil pipeline positioned between a pumping station and receiving station. The system includes an automatic valve which is capable of cutting off the flow of oil through the pipeline. Sensors are placed downstream from the automatic valve to monitor the conditions of the oil in the pipeline, the sensors being capable of detecting conditions which are indicative of a leak in the pipeline. When a leak is detected, the sensors actuate a drive means such as a reversible electric motor which is connected to the automatic valve. The drive means closes the automatic valve, thereby stopping the flow of oil through the pipeline downstream from the automatic valve. The system further includes a sump whcih is connected to the pipeline upstream from the automatic valve such that when the automatic valve is closed cutting off the flow of oil in the pipeline, the pumping station pumps oil into the sump. The sump contains a float which is connected to the pumping station such that when the oil in the sump reaches a predetermined level, the pumping station stops pumping oil. The line connecting the sump to the pipeline includes a check valve which will maintain the line between the sump and the pipeline closed when the automatic valve is opened. When the automatic valve closes, however, the check valve is opened to permit the flow of oil to be diverted to the sump. The sump may be located above ground or underground. When an underground sump is used, a dried up oil well serves the purpose very well.

The sensor which is used to sense the leak in the pipeline could be a pressure sensor for sensing the pressure of the oil flowing in the pipeline; a fluid level sensor for sensing the level of oil flowing into the pipeline; or, a combination of the two in order to provide a backup if one of the sensors should malfunction. Any other sensor which will detect a condition indicative of an oil leak could also be used.

The system further includes a flow meter for monitoring the amount of oil pumped by the pumping station and the amount of oil received by the receiving station. When a difference occurs between the amount of oil pumped and the amount of oil received, it could be indicative of a leak in the oil pipeline. Therefore, an indicator could be coupled to the flow meter to indicate the occurrence of this difference. The flow meters can also be coupled to recorders and/or computers for monitoring the oil flow through the system and this data could be used for any number of other purposes.

Once a determination has been made that a leak exists in the pipeline, it then becomes very important to determine the location of the leak. The present invention includes a leak location detector which injects a solution of radioactive sodium-24 in a low viscosity liquid such as kerosene, into the pipeline. Because of the immiscibility of the sodium-24 solution and the crude oil in the pipeline, these two liquids will not mix and therefore the sodium-24 solution will flow in the pipeline as a mass between two masses of crude oil if the valves in the pipeline are reopened to permit oil flow. Because of the low viscosity of the sodium-24 solution, when it reaches the point of the leak, it will rapidly flow through the leak into the surrounding areas. A Geiger counter may then be used to detect the location of the sodium-24 and thereby the location of the leak. Due to the short half-life of the sodium-24, it will have a negligible effect on the surrounding environment.

BRIEF DESCRIPTION OF THE DRAWINGS

The FIGURE is a diagram of the preferred embodiment of the disclosed invention.

DESCRIPTION OF THE PREFERRED EMBODIMENT

Referring to the FIGURE, oil is pumped by pumping station 2 through pipeline 4 to receiving station 6. The flow of oil through pipeline 4 is controlled by automatic valve 8 which is positioned relatively close to pumping station 2. Sensor 10 is positioned downstream from automatic valve 8 and is used to sense in the pipeline conditions which are indicative of a leak in pipeline 4. Upon the sensing of a condition indicative of a leak, sensor 10 actuates reversible motor 12 of vavle 8 in a direction that will close automatic valve 8 and thereby stop the flow of oil through pipeline 4 downstream from automatic valve 8.

Sensor 10 could be a pressure sensor for detecting the pressure of the oil flowing in pipeline 4. The sensor has a delay for reacting to a change in pressure in order to prevent the operation of automatic valve 8 in response to transients in the flow through pipeline 4. The sensor 10 could also be a level sensor for detecting the level of the oil in the pipeline. The level sensor may be installed directly into the pipeline or may be used in conjunction with a sump or tank coupled to the pipeline by a T-section. The tank or sump would be in the same horizontal plane as the pipeline and therefore any changes in the level of oil in the pipeline would simultaneously occur in the tank or sump. The level sensor, like the pressure sensor, would also have a delay to prevent a response to transient conditions. In order to enhance the detection capability of the sensors, the sensor 10 could include both the pressure sensor and level sensor which would operate together to determine a condition indicative of a leak in the pipeline. In this manner, if either sensor should fail, the other sensor would still be capable of sensing a condition indicative of a leak and operating motor 12 and thereby automatic valve 8 to stop the flow of oil through pipeline 4.

When a leak condition is detected by sensor 10, and automatic valve 8 is closed by means of the operation of motor 12, pumping station 2 continues to pump oil. The oil flows through pipeline 4 to automatic valve 8 and then into pipe 14 through check valve 16 into pipe 18 and then into sump 20. Pipes 14 and 18 are of the same diameter as pipeline 4 and valve 16 is a pressure operated check valve which opens to permit the flow of oil into sump 20. Sump 20 may be an oil storage tank located above ground or underground or may be a dried up oil well. Sump 20 includes a float 22 which detects the level of oil in sump 20. When the oil reaches a predetermined level, a signal from float 22 is used to stop the operation of pumping station 2. If the oil remains in sump 20 for long periods of time, it may be necessary to heat the oil in the sump. This is effected by heater 23.

Flow meter 24 is used to monitor the amount of oil pumped by pumping station 2. Flow meter 26, located at receiving station 6, is used to monitor the amount of oil received by receiving station 6. The output of the two flow meters is connected to flow monitor 28. Flow monitor 28 may include a computer for monitoring the amount of oil pumped and the amount of oil received and for noted significant discrepancies between the two. Flow monitor 28 could also include an alarm device for producing an alarm when a significant discrepancy occurs which is indicative of a leak in the pipeline. Furthermore, the data received by flow monitor 28 could also be used for various other purposes which require data regarding the amount of oil pumped from a well and the amount of oil received at the receiving station.

Once a leak has been detected, it then becomes a problem to determine the location of the leak so that it can be repaired. Leak location detector 30 is used for this purpose. Leak location detector 30 injects sodium-24 in solution with a low viscosity liquid such as kerosene into pipeline 4. Automatic valve 8 is then reopened by control station 32 which generates a signal for reversing motor 12. When oil flowing through pipeline 4 reaches the sodium-24 solution, the two will not mix because of the immiscibility of the two fluids. Therefore, the sodium-24 solution will flow as a mass down the pipeline. When it reaches the position of the leak, the sodium-24 solution will easily flow through the leak and into the area surrounding the leak outside of the pipeline. This is caused by the low viscosity of the solution. A Geiger counter may then be used to locate the sodium-24 and thereby the location of the leak. Sodium-24 has a half-life of 15 hours and therefore will present very little environmental problems. Furthermore, the amount of sodium-24 used would not be sufficient to cause any serious damage.

Once a leak has been located and repaired, the system may be restored to normal operation from control station 32. Control station 32 provides signals for reversing motor 12 to open automatic valve 8 and to open check valve 16 to allow oil to flow from sump 20 into pipeline 4. If sump 20 is located above ground, then the oil will flow from it into pipeline 4 through the action of gravity. If, however, sump 20 is located underground, a pump 34 may be used to pump the oil back into the pipeline 4. When sump 20 has been emptied, control station 32 starts the operation of pumping station 2 to allow for the normal flow of oil from pumping station 2 to receiving station 6.

Check valve 16 may be an automatic valve such as automatic valve 8, rather than a check valve. In this case, the output of sensor 10 would be coupled to motor 12 of automatic valve 8 and the corresponding motor of valve 16. When a leak is detected, the signal from the sensor would operate motor 12 in a direction to close automatic valve 8 and operate the motor associated with valve 16 to open the valve. Automatic valve 8 could be a Darling Valve No. S70DD gate valve or any other similar type of automatic valve.

While the invention has been particularly shown and described with reference to the preferred embodiment thereof, it will be understood by those skilled in the art that various changes in form and details may be made therein without departing from the spirit and scope of the invention.

I claim:

1. A system for preventing oil leaks in an oil pipeline between a pumping station and a receiving station, said system comprising:
  a. an automatic valve means in said pipeline, downstream from said pumping station, for stopping the flow of oil from said pumping station to said receiving station;
  b. sensor means in said pipeline, downstream from said automatic valve means, for sensing a condition of the oil flowing in said pipeline;
  c. drive means, coupled to said automatic valve means and controlled by said sensor means, for closing said automatic valve means in response to a predetermined condition in said pipeline, sensed by said sensor means;
  d. sump means, located between said pumping station and said automatic valve means, for receiving the oil in said pipeline when said automatic valve means is closed; and
  e. float means, in said sump means, for stopping the operation of said pumping station when the level of oil in said sump means reaches a predetermined level.

2. The system as set forth in claim 1 wherein said sump means comprises:
  a. a pipe connected to said pipeline;
  b. a sump, connected to said pipe, for receiving oil from said pipeline; and
  c. a valve means in said pipe, for preventing the flow of oil from said pipeline into said sump when said automatic valve is not closed.

3. The system as set forth in claim 2, wherein said sump is above ground and oil flows from said sump back into said pipeline under the force of gravity.

4. The system as set forth in claim 2, wherein said sump is below ground and wherein said sump means includes a pump to pump oil from said sump back into said pipeline.

5. The system as set forth in claim 2, wherein said sump means further includes a heater means for heating the oil in said sump.

6. The system as set forth in claim 1 wherein said sensor means includes a pressure sensor for sensing the pressure of the oil flowing in said pipeline.

7. The system as set forth in claim 1, wherein said sensor means includes a fluid level sensor for sensing the level of the oil flowing in said pipeline.

8. The system as set forth in claim 1, wherein said sensor means includes a pressure sensor for sensing the pressure of the oil flowing in said pipeline and a fluid level sensor for sensing the level of the oil flowing in said pipeline.

9. The system as set forth in claim 1, wherein said drive means comprises a reversible electric motor for opening and closing said automatic valve means.

10. The system as set forth in claim 1, further including flow meter means for measuring the amount of oil pumped by said pumping station and the amount of oil received by said receiving station and means for recording the output of said flow meter means.

11. The system as set forth in claim 10, further including indicator means for producing an indication when the amount of oil pumped by said pumping station is not equal to the amount of oil received by said receiving station.

12. The system as set forth in claim 1, further including leak location detector means for injecting sodium-24 in solution with a low viscosity fluid into the pipeline such that the solution will flow out of the pipeline through the leak whereby the leak may be located by tracing the radioactivity of the sodium-24.

13. The system as set forth in claim 2 wherein said valve means comprises a check valve which opens when the pressure on the valve reaches a predetermined level caused by the closing of said automatic valve means and the continued operation of said pumping station.

14. The system as set forth in claim 2 wherein said valve means comprises a normally closed second automatic valve and a corresponding drive means coupled to said sensor means such that when said sensor means detects said predetermined condition in said pipeline, said second automatic valve means is opened, thereby allowing said oil to be pumped into said sump.

* * * * *